Sheet 3 3 Sheets.

M. R. Molleur,
Hay-Press.

N° 74,571. Patented Feb. 18, 1868.

Witnesses:
W. E. Mans
L. L. Coburn

Inventor:
Moses Romual Molleur

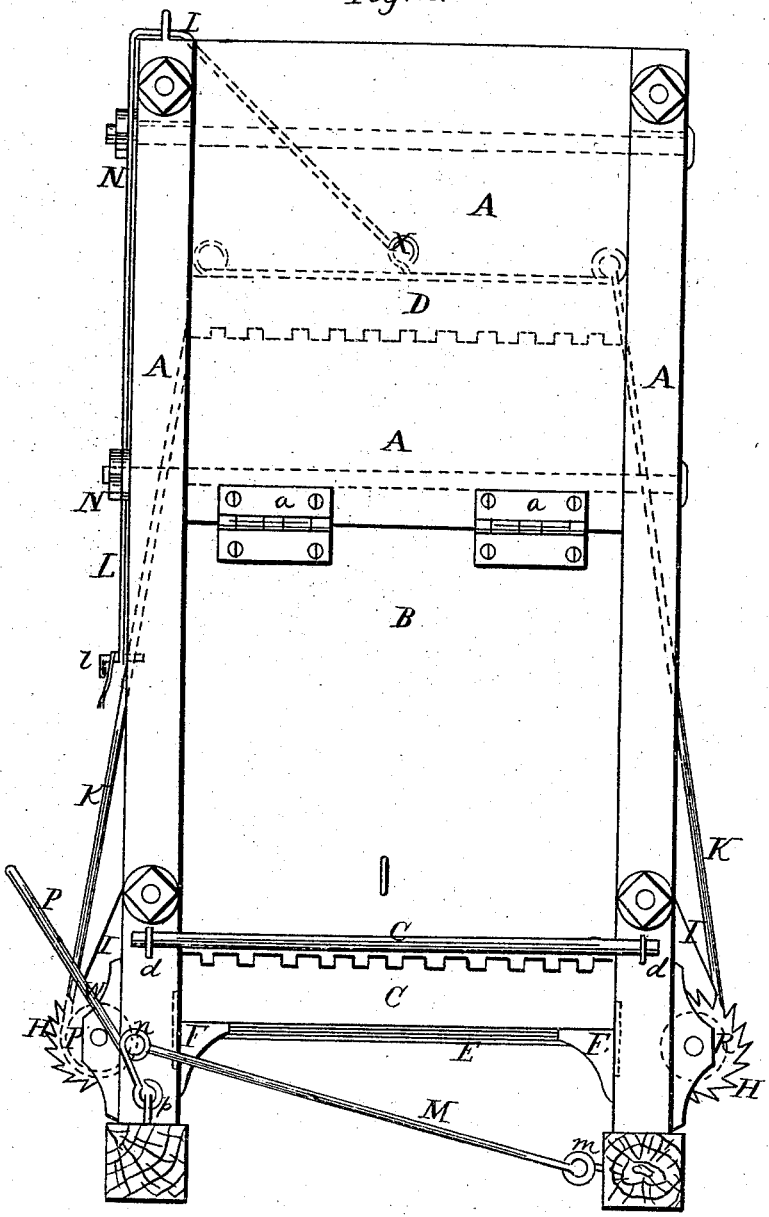

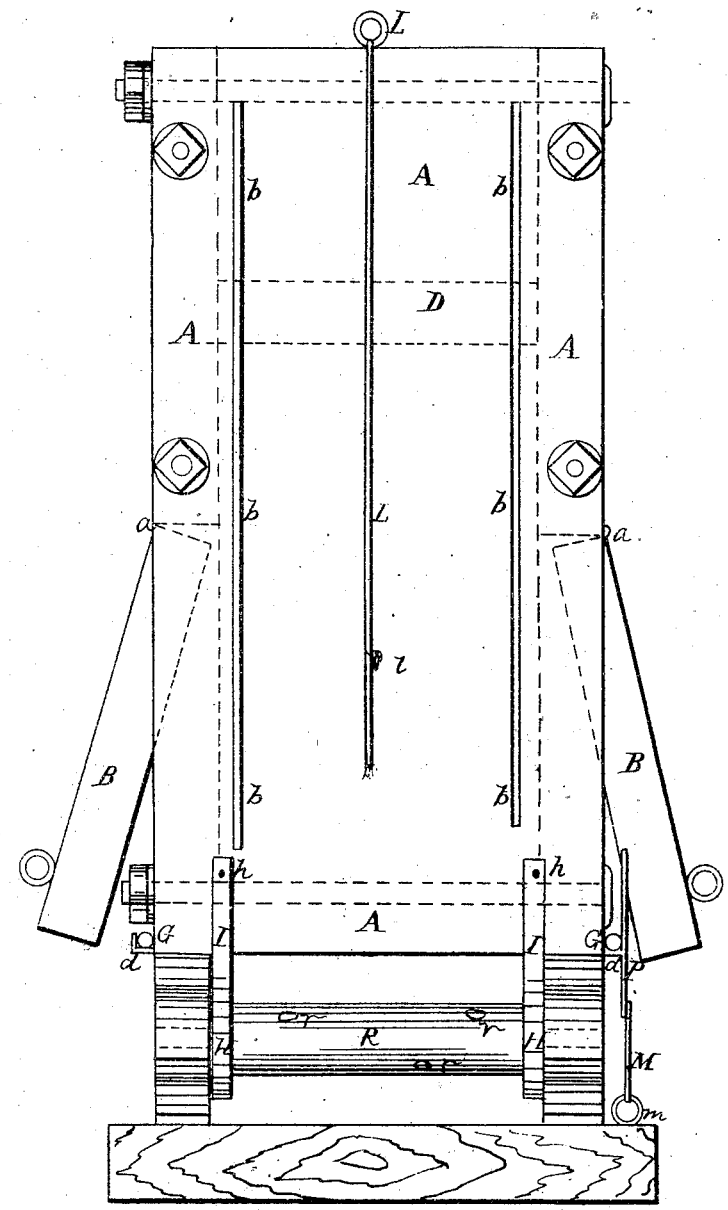

UNITED STATES PATENT OFFICE.

MOSES ROMUAL MOLLEUR, OF CHICAGO, ILLINOIS.

IMPROVEMENT IN HAY-PRESSES.

Specification forming part of Letters Patent No. 74,571, dated February 18, 1868.

*To all whom it may concern:*

Be it known that I, MOSES ROMUAL MOLLEUR, of Chicago, in the county of Cook and State of Illinois, have invented a new and useful Improvement in Hay-Presses; and I do hereby declare and make known that the following is a full, clear, and exact description of the same, reference being had to the accompanying drawings and the letters and figures marked thereon for reference, which form part of this specification.

My said invention consists in an improvement upon presses which are used for baling hay, but which may also be used for pressing and baling cotton or any other similar products, whereby the hay may be compressed into a very small compass, and can then be corded or secured in the form of a bale and removed from the press, as hereinafter specified.

To enable those skilled in the art to understand how to construct and use my said invention, I will proceed to describe the same with particularity, making reference in so doing to the aforesaid drawings, in which—

Figure 3:
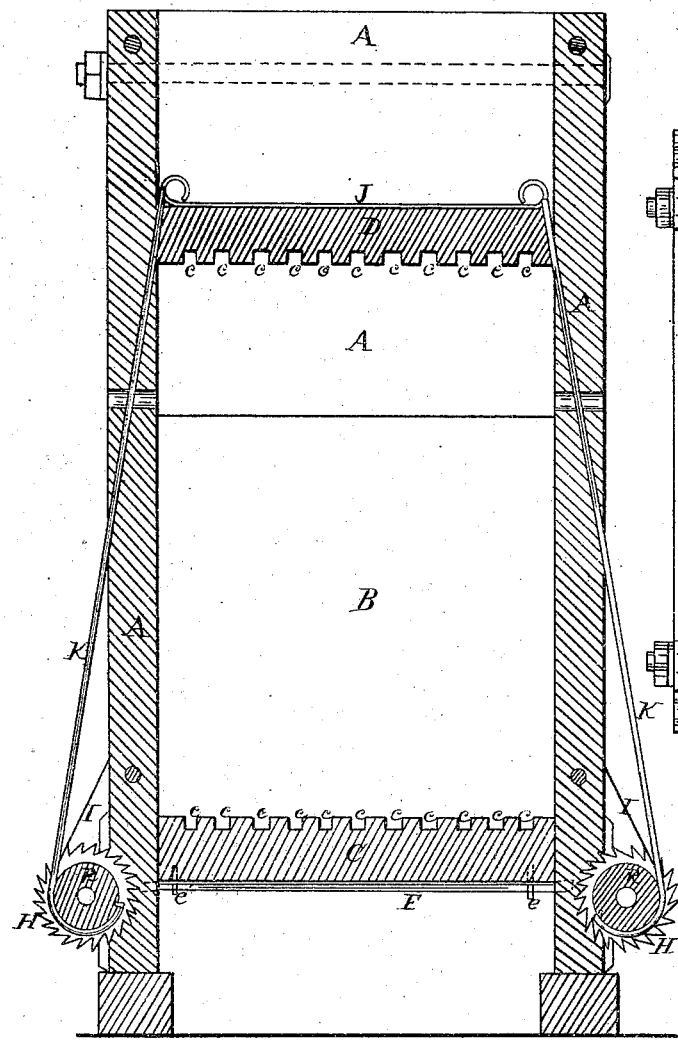
Figure 4:
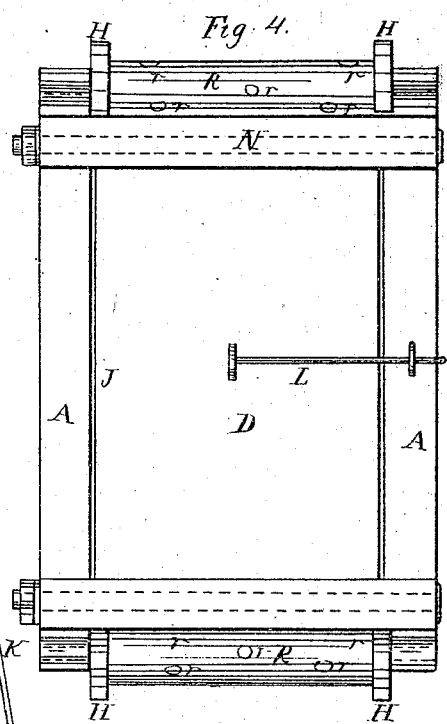

Figure 1 represents a side elevation of my invention; Fig. 2, an end view or elevation of the same. Fig. 3 is a vertical longitudinal section taken at the line $x$ in Fig. 2, and Fig. 4 is a plan or top view of the press.

Similar letters of reference in the several figures denote the same parts of my invention.

A represents an upright box of suitable height, whose plan area is of such dimension as to give the desired length and breadth to the bale of hay when pressed, composed of plank of suitable strength to resist the pressure when the press is in operation, and supported upon a suitable frame or pedestal, as shown in the drawings. The lower part of the front and rear of the press is hinged to the upper part of said front and rear, as seen in Fig. 1, the parts B being so hinged at $a$, by any suitable hinge of sufficient strength, as to allow said doors B to swing out when desired, as shown in Fig. 2, for the purposes hereinafter specified. The said box is firmly secured together, as shown, by rods and nuts, so as to prevent the bursting of the box under pressure. The bottom of the press (marked C) is supported at the rear of the press by a strong rod or bar, E, whose ends are entered into the frame in a strong and secure manner, while at the front it is supported upon pivoted rests or blocks F, said blocks, when turned up, as shown in Fig. 1, holding the bottom up against the lower end of the vertical box A, but which, when turned down outward, allow the front edge of the bottom C to drop down a short distance, as desired, and for the purposes hereinafter explained; or said movable bottom C may be supported to operate substantially in the manner described by any other suitable mechanical devices.

D represents the pressing-block, which fits into the box, as shown, to each corner of which is attached in any suitable manner a strong cord or chain, which cords or chains pass out through appropriate vertical slots in the sides of the box, (marked $b$,) as shown in Fig. 2, and down to rollers R, arranged upon opposits sides of the press, and having suitable strong bearings at the lower end of the machine, in which said rollers revolve, to which rollers the said cords or chains K are attached, as seen in Figs. 1 and 3. Upon each of said rollers, at one or both ends, are fixed ratchet-wheels H, with which pawls I engage, said pawls being pivoted to the press at $h$, so as to be turned to one side and be disengaged from the ratchet-wheels when desired. To the center of said pressing block or follower D is attached another cord, L, which passes out at the top of the press and down to a pin, $e$, to which it may be secured or tied, as shown in Figs. 1 and 2, which cord is to raise up the follower when the hay is to be put in the press.

It will be observed that the doors B are provided with a ring or handle, by which they may be opened or drawn out when desired, said doors being held in place by means of bars G passing across the same and lying in hooks or hasps $d$, fixed upon the end pieces of the box, as shown in the drawings, said bars being removed when the doors are to be opened.

In Fig. 1 is shown a device for springing the sides of the press apart in order to loosen the bales when they are to be removed, as hereinafter set forth.

M is a rod, one end of which is secured to one side of the frame at $m$, the other end of which is attached to a lever, P, at $n$, which last-mentioned lever P is attached to the opposite side of the machine, as shown, so that by moving the end of the lever P toward the machine it has a tendency to spread the sides of the press apart as desired.

Having described the construction of my machine, I will now describe the operation of the same. Assuming that the press is about to be filled with hay or other material to be pressed, the doors are secured by means of the bars G and the pawls I turned aside from the ratchet-wheels H, so as to allow the rollers to revolve freely while the cords K are unwound therefrom. The operator draws upon the cord L and raises up the follower D, bringing the point $x$ against the top of the box A, and retaining the said follower in a vertical position against the upper part of the press, leaving an open space through which the hay may be thrown in until the press or box A is full. The rollers R are then revolved by means of levers inserted in holes $r$ for that purpose, the pawls I being moved into or upon the ratchet-wheels H to prevent the reverse rotation of the rollers when the levers are changed from one hole to another. The follower D is drawn down to a horizontal position, and the continued rotation of said rollers winds up the cords K and draws the follower down upon the hay below the upper edge of the doors B, and until the hay is sufficiently compressed. The blocks F, which support the bottom C, are then adjusted so as to allow the said bottom to yield downward or fall slightly and remove its pressure from the lower edges of the doors B B, when the bars G are removed and the said doors opened and turned up, leaving the sides of the bale exposed to view. It will be seen that the upper side of the bottom C and the lower side of the follower D are provided with transverse grooves $c\ c$, through which, by means of a suitable needle or long wire, a cord is passed around over and under the bale to fasten and tie the same, confining the bale in the desired form and bulk. The ratchet-wheels are then released from the retention of the pawls, which removes the vertical pressure from the bale, when the nuts N are turned off slightly, so as to allow the sides of the press to be sprung apart by the lever P, as aforesaid, thus releasing the pressure from the ends of the bale, which is then readily removed from the press as desired. The nuts N are then turned up, the bottom C pressed up to place by means of the adjustable blocks F, and the doors B secured by the bars G, when the operation is repeated.

Having described the construction and operation of my invention, I will now proceed to specify what I claim and desire to secure by Letters Patent.

1. The combination of the vertical box A, provided with doors B B opening upward, the movable bottom C, follower D, cords K, rollers R, and ratchets and pawls H I, all arranged and operating as and for the purposes specified.

2. In combination with a hay-press having yielding sides, as described, the rod M and lever P, arranged and operating substantially in the manner and for the purposes set forth.

MOSES ROMUAL MOLLEUR.

Witnesses:
W. E. MAUS,
L. L. COBURN.